March 30, 1965  E. H. THARALSON ETAL  3,175,392
SOIL TESTING APPARATUS
Filed Oct. 16, 1961  2 Sheets-Sheet 1
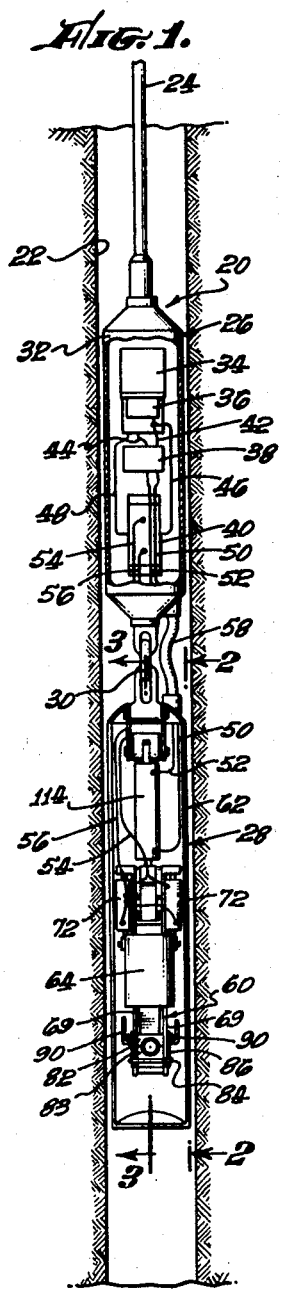
INVENTORS.
EARL H. THARALSON,
EDWARD CHARLES MIKOLYCZYK,
BY THEIR ATTORNEYS.
HARRIS, KIECH, RUSSELL & KERN.

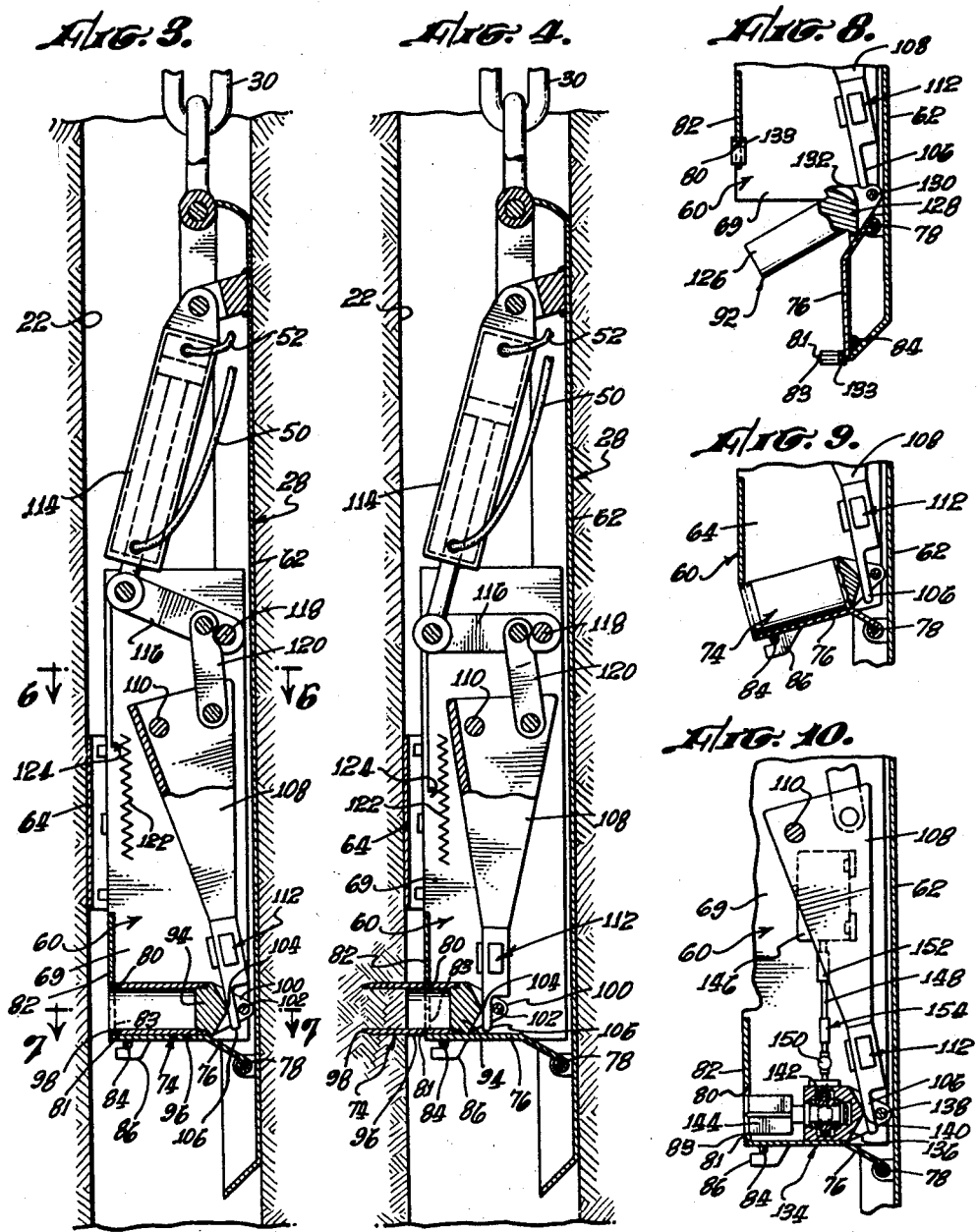

3,175,392
SOIL TESTING APPARATUS
Earl H. Tharalson, 264 W. Magnavista Ave., Arcadia,
Calif., and Edward Charles Mikolyczyk, 2268 Hill
Drive, Los Angeles 41, Calif.
Filed Oct. 16, 1961, Ser. No. 145,079
13 Claims. (Cl. 73—84)

The present invention relates in general to the field of soil mechanics and, more particularly, to an apparatus for soil testing, including such things as measuring soil bearing strength, compaction, hardness, density, moisture content, compressibility, elasticity, cohesion, shear strength, plastic flow penetrability, permeability and loss of pressure, obtaining soil cores, and the like.

It will be noted from the foregoing that the term "testing" is used herein in a general sense, unless otherwise qualified, and includes the obtaining of soil samples for laboratory tests, or other purposes. The term "soil" is also used generically to cover any formation to be tested, and is not to be regarded as limited to soil in the usual narrow sense. Also, it will be understood that the invention may be practiced in any location and at any depth, as in soil testing for surface or subsurface construction, oil well formation testing, and the like.

A primary object of the invention is to provide an apparatus for soil testing capable of measuring soil consolidation characteristics in situ so that it is unnecessary for many purposes to resort to, or rely solely on, laboratory analyses of soil samples.

Another and important object of the invention is to provide a soil testing apparatus capable of measuring soil consolidation characteristics in situ, and of obtaining soil cores for laboratory tests, in a hole of small diameter, e.g., a foot or less in diameter, thereby obviating the expense of test excavations large enough to admit personnel. It will be understood, however, that larger holes may be used.

A more specific object of the invention is to provide a testing apparatus for obtaining wet or dry samples in an undisturbed state for analysis in the laboratory, and to supplement, extrapolate or extend tests in situ. Laboratory tests may be duplicated in situ with the testing apparatus, test methods may be correlated with laboratory tests and prototype conditions with in-situ conditions or properties. Destructive and nondestructive tests may be conducted.

The invention contemplates a soil testing apparatus which includes a suitable supporting structure, hereinafter termed a frame for convenience, insertable into a hole in the soil to be tested, as by lowering it into the hole on a cable, or other suspension means. The frame carries a laterally extensible and retractable testing means or tool which, upon lateral extension thereof, is engageable with one side of the hole to test in situ the soil forming such side of the hole, the frame carrying actuating means for laterally extending and retracting the testing means. The testing means may be a plunger piston, tube, vane, blade, needle, wedge, cone, plate, probe or the like for use in measuring soil consolidation characteristics or it may be a coring tool or corer for removing a core from the side of the hole, a tool for use in measuring soil shear strength, or the like. The tool may be extended slowly or rapidly at a uniform rate or a non-uniform rate of travel, or may be extended to provide a uniform or non-uniform pressure on the tool as desired. When extended or partially extended the tool may be rotated, tilted, expanded, or the like.

An important object of the invention is to provide a soil testing apparatus having a frame which includes a large, adjustable main shoe engageable with the side of the hole opposite the side thereof to be tested, thereby providing a firm base for resisting reactive forces incident to laterally extending the testing means or tool into engagement with the side of the hole.

Another, and important, object is to provide a laterally extensible and retractable auxiliary shoe carried by the frame and laterally extensible into engagement with one side of the hole, preferably the side thereof opposite the main shoe, to securely lock the frame in place in the hole during the testing operation to be performed, the frame carrying means for laterally extending and retracting the auxiliary shoe. With this construction, the frame is completely immobilized during the testing operation to permit obtaining accurate and reliable results, which is an important feature.

Another object of the invention is to provide a soil testing apparatus wherein the actuating means for laterally extending and retracting the testing tool includes a lever mounted on and pivotable laterally relative to the frame and engaging the testing tool adjacent its free end, means carried by the frame being provided to pivot such lever laterally relative to the frame.

Another object is to provide means connected to the aforementioned actuating lever for measuring the resistance to lateral extension of the testing tool into the soil surrounding the hole, such resistance preferably being indicated at the surface.

Still another object of the invention is to provide a testing tool which is rotatable about an axis extending laterally of the frame, and thus laterally of the hole, so as to permit obtaining a measurement of the shear strength of the soil.

Another object is to provide means carried by the frame for rotating a shear testing tool about such a lateral axis. A related object is to provide means for rotating the shear testing tool which is carried by the actuating lever for laterally extending and retracting the tool, whereby the operation of the means for rotating the tool is unaffected by lateral extension of the tool.

Another object of the invention is to provide means, connected to the aforementioned means for rotating the shear testing tool, for measuring the resistance to rotation of the tool, the resistance to rotation preferably being indicated at the surface.

Another object is to provide an apparatus wherein each testing means or tool is removably mounted on the frame and is retained in its operating position by a movable retaining means which permits the desired lateral extension and retraction of the tool. With this construction, the apparatus may be operated with various testing tools used alternatively, depending upon the type of information desired.

Another object of the invention is to provide a soil testing apparatus which is a completely self-contained unit including its own power sources for operating the actuating means for extending and retracting the testing tool, for extending and retracting the auxiliary, locking shoe, for rotating the shear testing tool, and the like.

The foregoing objects, advantages, features and results of the present invention, together with various other objects, advantages, features and results thereof which will be evident to those skilled in the soil testing art in the light of this disclosure, may be achieved with the exemplary embodiments of the invention described in detail hereinafter and illustrated in the accompanying drawings, in which:

FIG. 1 is a view, partially in vertical section and partially in elevation, showing the soil testing apparatus of the invention in place in a hole in soil to be tested;

FIG. 2 is an enlarged fragmentary elevational view taken as indicated by the arrowed line 2—2 of FIG. 1;

FIG. 3 is an enlarged, vertical sectional view taken along the arrowed line 3—3 of FIG. 1;

FIG. 4 is a view similar to FIG. 3, but showing various parts of the apparatus in different positions;

FIG. 5 is a transverse sectional view taken along the arrowed line 5—5 of FIG. 2;

FIGS. 6 and 7 are transverse sectional views taken along the arrowed lines 6—6 and 7—7 of FIG. 3;

FIG. 8 is a fragmentary vertical sectional view duplicating the lower ends of FIGS. 3 and 4, but illustrating the manner in which an alternative testing tool is inserted into its operation position in the apparatus;

FIG. 9 is a fragmentary vertical sectional view similar to FIG. 8, but illustrating another embodiment of the invention;

FIG. 10 is a fragmentary vertical sectional view similar to the lower ends of FIGS. 3 and 4, but illustrating another testing tool of the invention; and FIG. 11 is a fragmentary transverse sectional view illustrating still another embodiment of the invention.

Referring initially to FIG. 1 of the drawings, the soil testing apparatus of the invention is designated generally by the numeral 20 and is shown as suspended in a test hole 22 by a cable 24, or other suitable suspension means. In the particular construction illustrated, the apparatus 20 is divided into an upper, power section 26 and a lower, operating section 28, the operating section being suspended from the power section by means of a pivoted link 30. With this construction, different operating and power sections may be substituted independently. For example, if repair of the power section 26 is necessary, a replacement power section may be substituted, thereby avoiding any necessity for withdrawing the entire apparatus 20 from use.

The power section 26 is shown as including a sealed housing 32 containing an electric motor 34 supplied through wires, not shown, incorporated in or attached to the supporting cable 24. The motor 34 drives a pump 36 which supplies hydraulic fluid under pressure to the operating section 28 of the apparatus 20 under the control of a commercially-available servo valve 38 and a commercially-available four-way selector valve 40. The valves 38 and 40 are preferably electrically operated and are controlled from the surface through wires, not shown, incorporated in or attached to the supporting cable 24. The servo valve 38 is connected to the pump 36 by pressure and return lines 42 and 44 and the selector valve 40 is similarly connected to the pump by pressure and return lines 46 and 48. Operating lines 50 and 52 extend downwardly from the servo valve 38 to the operating section 28 and, similarly, operating lines 54 and 56 extend downwardly from the selector valve 40 to the operating section. The operating lines 50, 52, 54 and 56 are housed in a flexible conduit 58 and are connected to components of the operating section 28 which will be described hereinafter.

It will be understood that the foregoing power section 26 is illustrative only and that other constructions may be used. For example, the motor 34 and the pump 36 may be replaced by an accumulator, not shown, containing hydraulic fluid maintained at a sufficiently high pressure to actuate the operating section 28 by a compressed gas.

Turning now to the operating section 28, it includes, as best shown in FIGS. 2 to 8 of the drawings, a suitable supporting structure 60, hereinafter referred to as a frame for convenience. In the particular construction illustrated, the frame 60 is of more or less open construction. However, it may be a complete, sealed housing, similar to the power-section housing 32, if it is necessary to use the operating section 28 submerged in liquid in the hole 22.

The frame 60 is provided on one side thereof with a main shoe 62 of arcuate cross section which extends the full length of the operating section 28 and which has an angular extent of the order of 120° to provide the main shoe with a large bearing area engageable with one side of the hole 22. This provides a firm base for resisting reactive forces incident to testing operations to be described hereinafter.

In order to positively lock the operating section 28 of the apparatus 20 in the hole 22 during the testing operations to be performed, the frame 60 has mounted thereon an auxiliary shoe 64 which is laterally extensible into engagement with the side of the hole opposite the side thereof engaged by the main shoe 62. The auxiliary shoe 64 is preferably diametrally opposite the main shoe 62 and is also of arcuate cross section, the auxiliary shoe having a substantial length and a substantial angular extent to provide it with a relatively large bearing area.

The auxiliary shoe 64 is provided with arms 66, shown as four in number, which extend laterally rearwardly toward the main shoe 62 and which are loosely constrained against vertical movement by guides 68 on laterally spaced side walls 69 of the frame 60. The auxiliary shoe 64 is loosely constrained against lateral movement, in a direction perpendicular to the desired direction of lateral movement toward and away from the main shoe 62, by the side walls 69 of the frame 60, two of the arms 66 being disposed on one side of these walls and the other two on the opposite side thereof, as will be clear from FIGS. 5 and 6 of the drawings. With this construction, the auxiliary shoe 64 is loosely guided for lateral retraction and extension toward and away from the main shoe 62 so that it will seat firmly against the side of the hole 22 opposite the side thereof against which the main shoe is seated, even though the side wall of the hole may be irregular.

The auxiliary shoe 64 is connected to the main shoe 62 by two toggle joints 70, each toggle joint being pivotally connected at one end to the main shoe and at its other end to the auxiliary shoe. The intermediate pivots of the toggle joints 70 serve to pivotally connect hydraulic motors 72 of the reciprocating type to the respective toggle joints, such motors being pivotally anchored to the frame 60 at their other ends. The hydraulic lines 54 and 56 leading from the selector valve 40 are connected to opposite ends of the cylinders of the hydraulic motors 72. As will be apparent from FIG. 2 of the drawings, when the selector valve 40 is positioned to deliver hydraulic fluid under pressure to the upper ends of the cylinders of the hydraulic motors 72 through the line 54, which is branched to connect to the upper ends of the cylinders of both motors, the motors extend to tend to straighten the toggle joints 70, thereby displacing the auxiliary shoe 64 laterally outwardly into engagement with one side of the hole 22. At the same time, the main shoe 62 is seated against the opposite side of the hole. As will be apparent, the auxiliary shoe 64 is retracted by reversing the selector valve 40 so as to deliver hydraulic fluid to the lower ends of the cylinders of the motors 72 through the hydraulic line 56, the latter being branched to connect to the lower ends of the cylinders of both motors.

The apparatus 20, as thus far described, is designed for insertion into a hole 22 of minimum diameter, e.g., of the order of nine inches. If it is desired to use the apparatus 20 in a larger hole, the operating section 28 may, in effect, be shimmed by adding thereto a secondary main shoe 62', FIG. 11, located behind the main shoe 62 and spaced therefrom a distance equal to the difference between the minimum hole diameter and the actual hole diameter. The curvature of the secondary main shoe 62' conforms to the curvature of the hole in which it is to be used.

Turning particularly to FIGS. 3 and 4 of the drawings, the operating section 28 of the apparatus 20 includes a testing means or tool 74, shown as a coring tool or corer in the embodiment under consideration, which is laterally extensible and retractable away from and toward the main shoe 62. The coring tool 74 is shown as partially extended in FIG. 4 of the drawings into a position wherein it has penetrated into the soil surrounding the hole 22 in the process of obtaining a core sample.

The coring tool 74 merely rests on a releasable retaining means having the form of a trap door 76 pivotally mounted on the main shoe 62 at 78 and, when closed, closing the lower end of the space between the laterally spaced walls 69 of the frame 60. When extended, the coring tool 74 projects through a semicircular opening 80 in a front wall 82 of the frame 60 and a complementary semicircular opening 81 in a front wall 83 of the trap door 76. Thus, the coring tool 74 is very simply guided for its lateral movement by the trap door 76, the laterally spaced walls 69 of the frame 60, and the peripheries of the openings 80 and 81 in the front walls 82 and 83 of the frame and the trap door.

The trap door 76 is provided with a transverse latch pin 84 engageable by pivoted latches 86 to latch the trap door in its closed position. The latches 86 are pivotally mounted on the laterally spaced walls 69 of the frame 60, and are biased into extended positions by springs 88. Latch release wires 90 are connected to the latches 86 and extend to the surface so that, if necessary, the trap door 76 may be unlatched from the surface. Such unlatching of the trap door 76 from the surface may, for example, be necessary in the event that the coring tool 74, or one of the other testing tools to be described, sticks in the soil surrounding the hole 22 and cannot be removed. In this event, the apparatus 20 may be removed from the hole, abandoning the stuck testing tool.

The coring tool 74 may be removed readily merely by unlatching the trap door 76 and withdrawing the tool. In FIG. 8 of the drawings is shown a compaction or bearing strength testing tool 92 in the process of being installed or removed to illustrate the manner in which such is accomplished. The tool 92 will be described in more detail hereinafter.

The coring tool 74 includes a head 94 carrying a core tube or barrel 96 having at its forward end a sharpened cutting edge 98 for penetration into the soil surrounding the hole 22. The head 94 is bifurcated at the rearward end of the coring tool 74 to provide rearwardly extending lugs 100 the space between which is spanned by a pin 102. The head 94 is provided forwardly of the pin 102 with an apex 104 in lateral alignment with the pin.

The space between the pin 102 and the apex 104 of the coring tool 74 is adapted to receive therein the free end 106 of an actuating lever 108 for laterally extending and retracting the coring tool. As will be apparent, particularly in view of the showing of the tool 92 of FIG. 8, the free end 106 of the actuating lever 108 is automatically inserted into the space between the pin 102 and the apex 104 of the coring tool 74 as the latter is inserted into its operating position and the trap door 76 is closed.

The actuating lever 108 is located between the laterally spaced walls 69 of the frame 60 and is pivotally mounted thereon, by a pivot pin 110, for lateral pivotal movement relative to the frame, whereby to laterally extend and retract the coring tool 74. The actuating lever 108 is provided thereon with strain gage means 112 for indicating the force applied to the particular testing tool being used, as will be discussed in more detail hereinafter. The strain gage means 112 is preferably connected to a suitable indicator and/or recorded at the surface, as by suitable wires, not shown.

The actuating lever 108 is pivoted laterally relative to the frame 60 by a hydraulic motor 114 of the reciprocating type, one end of this motor being pivotally anchored to the main shoe 62 and the other end thereof being pivotally connected to an intermediate lever 116 which is pivotally mounted on the frame 60 at 118. A link 120 is pivotally connected to the intermediate lever 116 intermediate the pivot 118 and the hydraulic motor 114, and is pivotally connected to the actuating lever 108. Thus, extension and contraction of the hydraulic motor 114 are converted into forward and rearward pivoting, respectively, of the actuating lever 108 to extend and retract, respectively, the coring tool 74, or other testing tool to be used.

The previously-discussed hydraulic lines 50 and 52 leading from the servo valve 38 are connected to the respective ends of the cylinder of the hydraulic motor 114. As will be apparent, when hydraulic fluid is delivered to the upper end of this cylinder through the line 52, the hydraulic motor is extended to extend the testing tool being used. Conversely, when operating fluid under pressure is delivered to the lower end of the cylinder of the hydraulic motor 114 through the line 50, the particular testing tool in use is retracted.

A linear potentiometer 122, having its movable contact 124 connected to the hydraulic motor 114, is provided to indicate the lateral position of the coring tool 74, or other tool being used. Such indication is preferably provided at the surface by suitable connections, not shown, to the potentiometer 122.

Turning now to FIG. 8 of the drawings, the testing tool 92 is used in measuring the bearing strength of the soil surrounding the hole 22 and includes a plunger 126, which may be of a standard diameter, e.g., 1.95 inches, having at its rearward end a head 128 similar to the head 94 of the coring tool 74 and provided with a similar pin 130 and apex 132 for the reception therebetween of the free end 106 of the actuating lever 108. The testing tool 92 is extended and retracted in the same way as the coring tool 74. The plunger 126 is normally smaller than the core tube 96, thus making necessary a guide for the outer end of the plunger, which guide is shown as a split bushing the halves 133 of which are inserted in the holes 80 and 81.

Referring to FIG. 9 of the drawings, it is sometimes desirable to obtain a core, or to conduct a bearing strength test, or a shear strength test, at an angle to the side of the hole 22 other than 90°. In this event, the lower ends of the laterally spaced walls 69 of the frame 60 are inclined at the desired angle, and the trap door 76 is similarly inclined, the latches 86 being correspondingly modified or relocated to accommodate the different closed position of the trap door. Thus, the particular testing tool in use, such as the coring tool 74 shown in FIG. 9, is positioned at the desired angle to the side of the hole 22.

Referring to FIG. 10 of the drawings, illustrated therein is a soil testing tool 134 for use in measuring the shear strength of the soil surrounding the hole 22. The shear testing tool 134 includes a head 136 similar to the heads 94 and 128 and similarly provided with a pin 138 and an apex 140 for the reception therebetween of the free end 106 of the actuating lever 108. Incorporated in the head 136 is worm gearing 142 which drives a cruciform vane 144 engageable with the soil surrounding the hole 22 and rotatable about the axis of the testing tool 134. The worm gearing 142 is connected to an electric motor 146 by shafting 148 which includes a universal joint 150 and a splined connection 152. With this construction, the motor 146 pivots back and forth with the actuating lever 108 so that its operation is independent of the angular position of the actuating lever. Changes in the angular relationship between the testing tool 134 and the actuating lever 108 as the latter is pivoted to move the testing tool 134 inwardly or outwardly are compensated for by the universal joint 150 and the splined connection 152. The latter also permits ready disconnection of the testing tool 134 from the electric motor 146 when it is desired to substitute another testing tool, such as the coring tool 74, or the tool 92 for use in measuring bearing strength.

The resistance to rotation of the vane 144 which is offered by the soil surrounding the hole 22 is measured by a strain gage means 154 secured to the shafting 148. The resistance to rotation of the vane 144 is preferably indicated and/or recorded at the surface by suitable connections, not shown, leading to the surface.

It will be understood that if the nature of the soil surrounding the hole 22 is such as to make a rotatable coring tool, not shown, with a toothed cutting edge desirable, such a coring tool may be driven by the electric motor 146 in the same manner as the shear testing tool 134. Also, the coring tool may be provided with means, not shown, for cutting off the core upon reversing of the motor 146.

Another testing tool, not shown, which may be used is a plate for measuring soil plate bearing strength. Such a plate could, for example, be attached to the outer end of the plunger 126.

*Operation*

It will be assumed that, prior to placing the apparatus 20 in operation, it will have been suitably calibrated so that the strain gage means 112 and 154 and the linear potentiometer 122 will provide meaningful indications and/or recordings at the surface. The manner in which calibrations of this nature are made is well known in the art so that a further discussion herein is unnecessary.

In using the apparatus 20, the desired testing tool, e.g., the coring tool 74, the bearing strength testing tool 92 or the shear strength testing tool 134, is placed in its operating position in the manner hereinbefore described. The apparatus 20 is then lowered into the hole 22 to the desired depth and is locked firmly in place by actuating the selector valve 40 to extend the auxiliary shoe 64.

The foregoing accomplished, the servo valve 38 is actuated to extend the desired testing tool into the soil surrounding the hole 22.

In the event that the coring tool 74 is in use, it is preferably extended at a uniform and relatively high speed, e.g., six inches per minute, until it reaches its fully extended position, or until it encounters an obstruction preventing further movement. The coring tool 74 should not be extended beyond its filled position to avoid compaction of the sample. The coring tool 74 is then retracted by reversing the operation of the servo valve 38, to withdraw the coring tool 74, and the core therein, into the frame 60.

When using the testing tools 74, 92 and 134, the tool is extended at the maximum rate until the soil surrounding the hole 22 is engaged. Then, the rate of extension is reduced by the operator at the surface to a much slower test speed of the order of, for example, 0.050 inch per minute, the penetration into the soil at this rate being limited to approximately one-half inch. During this period, readings are taken of the position of the testing tool and the load applied thereto with respect to time, such readings being obtained from the potentiometer 122 and the strain gage means 112 and being recorded relative to a suitable time scale. Such readings may be taken and/or recorded at the surface, or may be recorded in the apparatus itself. When the shear testing tool 134 is in use, the electric motor 146 for driving it is also energized, and readings are also taken of the resistance of rotation met by the vane 144. The latter readings are obtained from the strain gage means 154.

Once the particular test being conducted has been completed and the testing tool in use has been withdrawn into the frame 60, the auxiliary shoe 64 is released and the apparatus 20 may be withdrawn from the hole 22. Alternatively, additional tests at other locations may be conducted with tools for testing consolidation characteristics, such as the tools 92 and 134. It will be understood that all of the testing tools may be retracted into the frame 60 at maximum speed.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim:
1. A soil testing apparatus insertable into a hole in the soil to be tested, including: a frame insertable into the hole and having on one side thereof a main shoe substantially coextensive with said frame in the direction of the hole and engageable with one side of the hole; a laterally extensible and retractable auxiliary shoe which is carried by said frame and which is small as compared to said main shoe and which is laterally extensible into engagement with the opposite side of the hole from said main shoe to lock said frame in place in the hole; means carried by said frame and connected to said auxiliary shoe for laterally extending and retracting said auxiliary shoe; means, including laterally extensible and retractable testing means carried by said frame and laterally extensible into engagement with the opposite side of the hole from said main shoe, for testing in situ the soil forming said opposite side of the hole; and means carried by said frame and connected to said testing means for laterally extending and retracting said testing means.

2. A soil testing apparatus insertable into a hole in the soil to be tested, including: a frame insertable into the hole and having on opposite sides thereof shoes respectively engageable with opposite sides of the hole, said shoes being laterally extensible and retractable relative to each other; means carried by said frame for relatively laterally extending and retracting said shoes; means, including laterally extensible and retractable testing means carried by said frame and laterally extensible into engagement with the opposite side of the hole from one of said shoes, for testing in situ the soil forming said opposite side of the hole; and means carried by said frame and connected to said testing means for laterally extending and retracting said testing means, including a lever mounted on and pivotable laterally relative to said frame and engaging said testing means, and including means carried by said frame and connected to said lever for pivoting said lever laterally relative to said frame.

3. A soil testing apparatus insertable into a hole in the soil to be tested, including: a frame insertable into the hole and having on opposite sides thereof shoes respectively engageable with opposite sides of the hole, said shoes being laterally extensible and retractable relative to each other; means carried by said frame for relatively laterally extending and retracting said shoes; means, including laterally extensible and retractable testing means carried by said frame and laterally extensible into engagement with the opposite side of the hole from one of said shoes, for testing in situ the soil forming said opposite side of the hole; means carried by said frame and connected to said testing means for laterally extending and retracting said testing means, including a lever mounted on and pivotable laterally relative to said frame and engaging said testing means, and including means carried by said frame and connected to said lever for pivoting said lever laterally relative to said frame; and means carried by said lever and connected to said testing means for rotating said testing means about an axis extending laterally of said frame.

4. A soil testing apparatus insertable into a hole in the soil to be tested, including: a frame insertable into the hole; means, including laterally extensible and retractable testing means carried by said frame and laterally extensible into engagement with one side of the hole, for testing in situ the soil forming said one side of the hole; means carried by said frame and connected to said testing means for laterally extending and retracting said testing means; means carried by said frame and connected to said testing means for rotating said testing means about an axis extending laterally of said frame; means, connected to said means for laterally extending and retracting said testing means, for measuring the resistance to lateral extension of said testing means; and means, connected to said means for rotating said testing means, for measuring the resistance to rotation of said testing means.

5. A soil testing apparatus insertable into a hole in the soil to be tested, including: a frame insertable into the hole; means, including laterally extensible and retractible testing means carried by said frame and laterally extensible into engagement with one side of the hole, for testing in situ the soil forming said one side of the hole; means carried by said frame and connected to said testing means for laterally extending and retracting said testing means; means carried by said frame and connected to said testing means for rotating said testing means about an axis extending laterally of said frame; and means, connected to said means for rotating said testing means, for measuring the resistance to rotation of said testing means.

6. A soil testing apparatus insertable into a hole in the soil to be tested, including: a frame insertable into the hole; means, including laterally extensible and retractible testing means carried by said frame and laterally extensible into engagement with one side of the hole, for testing in situ the soil forming said one side of the hole; and means carried by said frame and connected to said testing means for laterally extending and retracting said testing means, including a lever mounted on and pivotable laterally relative to said frame and having a movable free end drivingly engaging said testing means, and including means carried by said frame and connected to said lever for pivoting said lever laterally relative to said frame, said free end of said lever being laterally movable a distance greater than one-half the diameter of said apparatus.

7. A soil testing apparatus insertable into a hole in the soil to be tested, including: a frame insertable into the hole; means, including laterally extensible and retractible testing means carried by said frame and laterally extensible into engagement with one side of the hole, for testing in situ the soil forming said one side of the hole; and means carried by said frame and connected to said testing means for laterally extending and retracting said testing means, including a lever mounted on and pivotable laterally relative to said frame and having a movable free end drivingly engaging testing means, and including double acting means carried by and extending longitudinally of said frame and connected to said lever for pivoting said lever laterally relative to said frame, said free end of said lever being laterally movable a distance greater than one-half the diameter of said apparatus.

8. A soil testing apparatus insertable into a hole in the soil to be tested, including: a frame insertable into the hole; means, including a laterally extensible and retractable testing means carried by said frame and laterally extensible into engagement with one side of the hole, for testing in situ the soil forming said one side of the hole, said testing means being removable from said frame; movable retaining means carried by said frame and engageable with said testing means for releasably mounting means on said frame; release means extending from said retaining means to and being actuable from a point externally of the hole for releasing said retaining means; and means carried by said frame and engageable with said testing means for laterally extending and retracting said testing means.

9. A soil testing apparatus insertable into a hole in the soil to be tested, including: a frame insertable into the hole; means, including a laterally extensible and retractable plunger carried by said frame and laterally extensible into engagement with one side of the hole, for measuring in situ the bearing strength of the soil forming said one side of the hole, said plunger being removable from said frame; movable retaining means carried by said frame and engageable with said plunger for releasably mounting said plunger on said frame; and means carried by said frame and engageable with said plunger for laterally extending and retracting said plunger.

10. A soil testing apparatus insertable into a hole in the soil to be tested, including: a frame insertable into the hole; means, including a laterally extensible and retractable vane carried by said frame and laterally extensible into engagement with one side of the hole, for measuring in situ the shear strength of the soil forming said one side of the hole, said vane being removable from said frame; movable retaining means carried by said frame and engageable with said vane for releasably mounting said vane on said frame; means carried by said frame and engageable with said vane for laterally extending and retracting said vane; means carried by said frame and engageable with said vane for rotating said vane about an axis extending laterally of said frame; and means for measuring the resistance to rotation of said vane.

11. A soil testing apparatus insertable into a hole in the soil to be tested, including: a frame insertable into the hole; means, including a laterally extensible and retractable shear testing tool carried by said frame and laterally extensible into engagement with one side of the hole and rotatable about an axis extending laterally of said frame, for measuring in situ the shear strength of the soil forming said one side of the hole; means carried by said frame and connected to said tool for laterally extending and retracting said tool; means carried by said frame and connected to said tool for rotating said tool about said lateral axis; and means for measuring the resistance to rotation of said tool.

12. A soil testing apparatus insertable into a hole in the soil to be tested, including:
 (a) a frame insertable into the hole;
 (b) means, including laterally extensible and retractable testing means carried by said frame and laterally extensible into engagement with one side of the hole, for testing in situ the soil forming said one side of the hole;
 (c) means carried by said frame and connected to said testing means for laterally extending and retracting said testing means, including a lever mounted on and pivotable laterally relative to said frame and having a moveable free end drivingly engaging said testing means, and including means carried by said frame and connected to said lever for pivoting said lever laterally relative to said frame; and
 (d) means connected to said lever for measuring the resistance to lateral extension of said testing means, said free end of said lever being laterally movable a distance greater than one-half the diameter of said apparatus.

13. A soil testing apparatus insertable into a hole in the soil to be tested, including: a frame insertable into the hole; means, including laterally extensible and retractable testing means carried by said frame and laterally extensible into engagement with one side of the hole, for testing in situ the soil forming said one side of the hole; means carried by said frame and connected to said testing means for laterally extending and retracting said testing means; and means carried by said frame and connected to said testing means for rotating said testing means about an axis extending laterally of said frame.

References Cited by the Examiner

UNITED STATES PATENTS

| | | | |
|---|---|---|---|
| 2,603,967 | 7/52 | Carlson | 73—84 X |
| 2,612,346 | 9/52 | Nelson | 175—77 |
| 2,725,283 | 11/55 | Mounce et al. | 73—152 X |
| 2,824,445 | 2/58 | Reese | 73—89 |
| 2,907,204 | 10/59 | Gibbs | 73—101 |
| 2,957,341 | 10/60 | Menard | 73—84 |
| 3,079,793 | 3/63 | Le Bus et al. | 73—152 |

FOREIGN PATENTS 704,290   2/54   Great Britain.

RICHARD C. QUEISSER, *Primary Examiner.*

ROBERT L. EVANS, *Examiner.*